United States Patent Office 3,592,752
Patented July 13, 1971

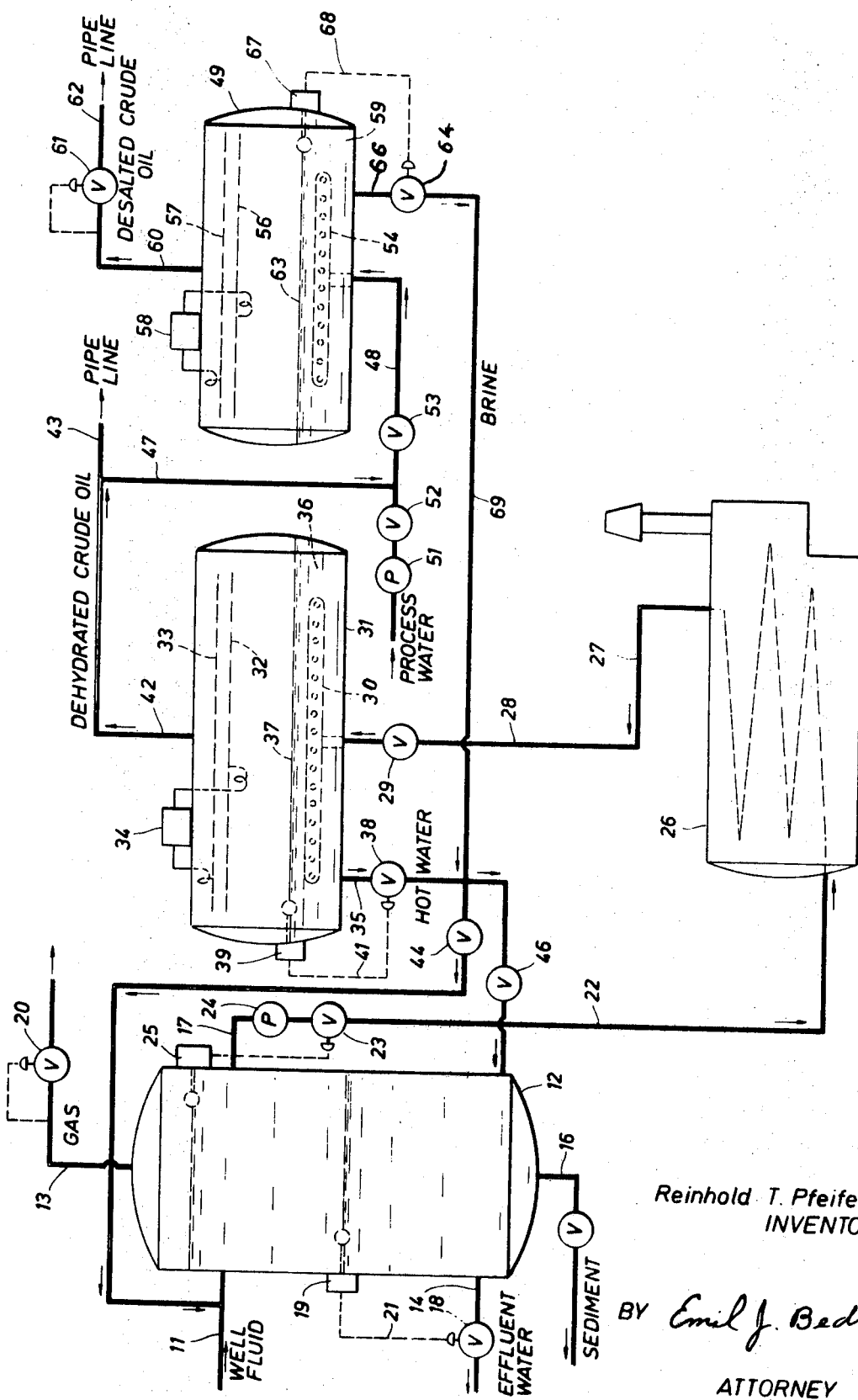

3,592,752
SYSTEM FOR TREATING WELL FLUIDS CONTAINING CRUDE OIL ADMIXED WITH LARGE VOLUMES OF WATER
Reinhold T. Pfeifer, Houston, Tex., assignor to Petrolite Corporation, St. Louis, Mo.
Filed Apr. 28, 1969, Ser. No. 819,910
Int. Cl. B03c 5/00, 5/02
U.S. Cl. 204—188          6 Claims

ABSTRACT OF THE DISCLOSURE

This specification discloses:

A system including process and apparatus for treating a well fluid (i.e., a mixture of highly viscous crude oil with large volumes of water and some solids) produced by conducting thermal recovery operations in subterranean reservoirs. The well fluid is separated in a gravity separation zone into an oil-free aqueous phase and a wet crude oil phase. The wet crude oil, after being heated, is subjected to an electric field which produces a dehydrated crude oil phase and a heated aqueous phase. The heated aqueous phase is intermixed with well fluid in the gravity separation zone. The aqueous phase is removed from the gravity separation zone to maintain therein a substantially constant ratio of water to crude oil. If desired, the dehydrated crude oil phase, after being mixed with fresh water, can be subjected to an electric field for producing a desalted crude oil phase and an aqueous phase (brine) carrying extracted salts and solids. This aqueous phase (brine) may be returned to the gravity separation zone for disposal.

The present system is especially suited for treating a well fluid which is a mixture of crude oil and water in volume ratios greater than 1 to 2, and especially wherein the volume ratio is about 1 to 10.

BACKGROUND OF THE INVENTION

(1) Field of the invention

This invention relates to the separation of well fluid into crude oil and water phases. More particularly, the invention relates to the separation of well fluid into a crude oil phase with small amounts of residual water and aqueous phase with small amounts of residual crude oil.

(2) Description of the prior art

There are many subterranean formations which contain vast quantities of viscous crude oil that cannot be recovered by primary production mechanisms. In such situations, thermal recovery operations are employed to stimulate the flow of crude oil from the formations.

A commonly used thermal recovery operation is the injection of hot aqueous fluids into the formations. These fluids raise the temperature of the connate crude oil whereby its viscosity is reduced. Additionally, these aqueous fluids provide water drive mechanisms to displace the crude oil to production wells.

The well fluid recovered from production wells is usually a mixture of the highly viscous crude oil and large volumes of water, and small amounts of solids, namely sand. In some instances, the well fluid may consist primarily of water with some interspersed crude oil.

The amount of water in the well fluid is highly variable and depends upon the chronological status of the thermal recovery operation. For example, in one thermal recovery operation the well fluid was composed of a crude oil of about 17° API gravity and water in a mixture with their volumetric ratios greater than 1 to 2. Usually the volumetric ratio of crude oil to water in the well fluid was above 1 to 10.

Conventional gas-oil-water separators can handle primary production of a well fluid with relatively large amounts of water. However, the production of well fluid from thermal recovery operations is very large. In some areas, this production of well fluid has reached levels of 200,000 barrels per day. Thus, economics prevent use of a large multitude of conventional field separators to recover the crude oil where it may be present in only 10 percent by volume of the well fluid.

Proposals have been made to use large settling tanks to make initial separations between the crude oil and water. A relatively oil-free water phase will separate in a storage tank in a short period of time. However, the resulting crude oil phase is very wet. Extended residence in settling tanks improves the crude oil phase but would require several days to obtain acceptable results. Obviously, the surface of the lease becomes rapidly covered with a multitude of large tanks when the production of well fluid is very large. For example, consider the number of 5000 barrel tanks required to provide a 3-day settling time for a 200,000 barrel per day production of well fluid.

The settling tank time can be reduced by raising the temperature of the crude oil phase. However, internal heaters (steam coils etc.) in the settling tanks cause a remixing of phases by fluid-circulation currents in the heated well fluid that tend to offset the reduced settling time.

The wet crude oil phase from the settling tanks must have a water content less than 3 percent by volume before it is accepted for transportation in a pipeline. The crude oil is best dehydrated, after being heated to elevated temperatures, by subjecting it to an electric field to coalesce the dispersed water. Obviously, the entire well fluid cannot be economically heated to the desired elevated temperatures.

The dehydrated crude oil, while hot, may be desalted in the field. For this purpose, fresh water in amounts of up to about 15% by volume, and usually between about 3 and 5 percent by volume, are mixed with the crude oil. The resulting mixture is then subjected to an electric field to coalesce the dispersed water which is a brine carrying the extracted salts and solids. The desalted crude oil can be processed in refineries without further treatment. However, the highly concentrated brine must be disposed without pollution of fresh water streams, etc.

The present invention is a system for treating a well fluid obtained from thermal recovery operations conducted in subterranean formations to produce a dehydrated crude oil, and if desired, a desalted crude oil, without the use of multitudinous large settling tanks and their attended problems. Further, the system provides for heat conservation, optimum water utilization, and disposal of brines in an advantageous manner.

SUMMARY OF THE INVENTION

This invention is a system for treating a well fluid formed of a mixture of highly viscous crude oil and large volumes of water obtained by conducting thermal recovery operations in subterranean reservoirs.

The system includes a process wherein the well fluid is passed into a gravity separation zone to produce an aqueous phase comprised substantially of water and possibly a small amount of solids (the aqueous phase being substantially free of crude oil), and a wet crude oil phase. The wet crude oil phase, after being heated to suitable elevated temperatures is subjected to an electrical field for producing a dehydrated crude oil phase, which phase contains less than about 3% by volume of water, and a heated aqueous phase. The heated aqueous phase is mixed with the well fluid in the gravity separation zone for direct heat exchange therewith. The aqueous phase is removed in sufficient amounts from the gravity separation zone for maintaining therein a substantially constant ratio of water to crude oil volumes.

Apparatus is provided in the system of this invention for treating the well fluid. A gravity separator is provided with a well fluid inlet and outlets for separated aqueous and wet crude oil phases. A heater is connected to the wet crude oil outlet on the gravity separator and an outlet provides a stream of heated crude oil. An electrical dehydrator, by connection to the heater, subjects the heated crude oil to an electric field which produces a dehydrated crude oil phase and a heated aqueous phase. The aqueous phase is carried through conduit means from the electric dehydrator into the gravity separator for direct heat exchange therein with the well fluid. Level control means effect the removal of the aqueous phase from the gravity separator in sufficient amounts to maintain a substantially constant volume of the aqueous phase therein.

Electrical desalting may be employed in one embodiment of the system upon the dehydrated crude oil produced by the electrical dehydration. Fresh water is intermixed with the dehydrated crude oil phase. Then, the resulting mixture is subjected to an electrical field to produce a desalted crude oil phase and an aqueous phase containing extracted salts and solids. The aqueous phase is returned to the gravity separation zone for its disposal.

DESCRIPTION OF THE DRAWING

The figure in the drawing is a schematic flow diagram of an arrangement of apparatus for separating well fluid into gas, crude oil and water phases according to the present invention.

DESCRIPTION OF SPECIFIC EMBODIMENTS

Referring to the drawing, there is illustrated an arrangement of apparatus suitable for practicing the present invention. A stream of well fluid is obtained from a suitable source such as from production wells employed in conducting thermal recovery operations in subterranean reservoirs. The well fluid, formed of a mixture of highly viscous crude oil and large volumes of water, and possibly some solids, namely sand, is collected by an inlet manifold 11 and then passed into a gravity separator 12. Generally, this well fluid contains crude oil and water admixed in volumetric ratios greater than 1 to 2, and usually greater than 1 to 10. The well fluid may contain a very small amount of gas released at static pressure conditions within the gravity separator 12.

The gravity separator 12 may be any suitable vessel capable of retaining the bulk of the well fluid for a short period of time required to form a wet crude oil phase and an aqueous phase which comprises substantially water, and possibly small amounts of entrained solids. The aqueous phase is substantially free of crude oil. For example, the separator 12 may be a storage tank with an aqueous phase retention time of several hours to produce an aqueous phase substantially free of crude oil. Generally, the retention time within the gravity separator 12 of the aqueous phase will be less than one-half day. The well fluid separates in the gravity separator 12 into a gas phase (if any) which is removed under static pressure conditions through an overhead gas outlet 13 containing a back pressure valve 20, an aqueous phase removed through lower outlet 14, and accumulated solids removed through sediment outlet 16 formed in the bottom of the separator 12. The wet crude oil phase is removed through outlet 17.

The retention time of the aqueous phase in the separator 12 needs not to exceed that time period whereby the aqueous phase removed through outlet 14 is substantially free of crude oil. The wet crude oil phase may contain a large amount of water but it is only a fractional volume of the well fluid. Thus, the wet crude oil phase may be readily dehydrated in an electrical treater of reasonable commercial size. For example, the well fluid may contain only 10 percent crude oil. This amount of crude oil with an equal volume of water may be the wet crude oil phase removed through the outlet 17.

The gravity separator 12 is operated at ambient temperatures which are established by the incoming well fluid. Generally, this temperature will be between 65 and 100 degrees Fahrenheit depending upon the particular environment and the mode of conducting the thermal recovery operations. An aqueous phase, containing water and possibly some solids, readily separates from the crude oil in a very short period of time in the gravity separator 12. As mentioned, this aqueous phase is substantially free of crude oil. Therefore, the retention time in the gravity separator 12 is not determined by the longer period required to obtain a wet crude oil phase with a water content less than 3% by volume.

The controlled removal of the aqueous phase from the gravity separator 12 is provided by a motor valve 18 actuated by a level controller 19 through any convenient interconnection illustrated by chain line 21. Thus, a relatively fixed volume of the aqueous phase is maintained in the separator 12 which produces a relatively fixed ratio of water to crude oil volumes within the gravity separator 12. The aqueous phase obviously is compatible with the subterranean formations containing the crude oil. Thus, the aqueous phase may be injected into these formations as a hot water drive, or otherwise employed in the conduct of the thermal recovery operations from which it was obtained. The amounts of gas contained in well fluid produced by thermal recovery operations are usually negligible.

The wet crude oil is controllably removed from the gravity separator 12 by the outlet 17 and moved by a pump 24 through conduit 22 containing a control valve 23 into a heater 26. A level controller 25 interconnected, as illustrated by a chain line, to the control valve 23 regulates the rate of fluid flow in the conduit 22 whereby a relatively constant volume of wet crude oil is maintained in the gravity separator 12. The heater 26 may be of any suitable construction which is capable of raising the temperature, of the wet crude oil phase, sufficiently to permit electrical dehydration. Elevated temperatures facilitate electrical dehydration of the wet crude oil phase, and usually require a temperature above about 150° F. Usually, there will be some particular elevated temperature which provides optimum crude oil dehydration. The heated crude oil phase passes from the heater 26 through outlet 27 and is carried by conduit 28 through block valve 29 into an electrical dehydrator 31.

The electrical dehydrator 31 may be of any suitable construction whereby the wet crude oil phase is electrically resolved into a dehydrated crude oil phase and an aqueous phase. For example, the electric treater shown in U.S. Pat. 2,855,359 may be used. In such a device, the heated wet crude oil passes through a distributor 30 for uniform introduction across the horizontal cross section of the electric dehydrator 31. The electric dehydrator 31 contains energized electrodes 32 and 33 which are connected to a source of high voltage provided by transformer 34. An electric field is established in the area about the electrodes within the electric dehydrator 31. The heated crude oil enters the electric field adjacent these electrodes and as a result, water is coalesced from the crude oil phase. The water gravitates downwardly to form a body of water 36 in the lower portions of the dehydrator 31.

The dehydrated crude oil phase accumulates adjacent the electrodes above the body of water 36. An interface 37 is maintained at constant level between the body of water 36 and the superimposed crude oil phase. The aqueous phase is removed through outlet 35 at a controlled rate through a motor valve 38 connected to a level controller 39 by any suitable connection such as illustrated by chain line 41.

The electrical dehydrator need only reduce the volume of water in the dehydrated crude oil phase to less than about 3% by volume. Crude oil containing 3% by volume of water, or less, is accepted for transportation in a pipeline. The dehydrated crude oil phase passes from the dehydrator 31 through the outlet 42 and may be sent into a pipeline 43 for shipment to subsequent utilization.

It is apparent that the body of water 36 in the dehydrator 31 is at elevated temperature substantially the same in magnitude as in the wet crude oil phase flowing from the outlet 27 of the heater 26. The heated aqueous phase removed from the dehydrator 31 in outlet 35 is ing well fluid in the manifold 11. Alternatively, the heated aqueous phase may be sent through a block valve 46 into the gravity separator 12 for mixing with the aqueous phase present therein. If desired, the heated aqueous fluid may be divided and mixed with both the well fluid and the aqueous phase within the gravity separator 12. Preferably, the heated aqueous phase is intermingled only with the incoming well fluid since less thermal disturbances are created within the gravity separator 12 by the direct heat exchange of the hot aqueous phase from the dehydrator 31 with the incoming well fluid.

The heat energy carried in the aqueous phase from the dehydrator 31 into the gravity separator 12 raises the temperature of the wet crude oil phase, and as a result, an increased separation of water from the wet crude oil phase is obtained. Advantageously, the well fluid is heated in the separator 12 without using auxiliary heating tubes, or the like, in gravity separator 12 which would cause thermally induced circulating currents.

The dehydrated crude oil may contain sufficiently large amounts of salts and solids that make necessary the desalting of the dehydrated crude oil. There are several advantages to conduct desalting at the field location. First, the dehydrated crude oil in outlet 42 is at elevated temperatures. Since desalting requires elevated temperatures in the crude oil, a conservation of heat energy is obtained. Second, the aqueous phase from desalting is a brine which creates disposal problems. The present system processes such vast amounts of water that brine may be mixed with such water and disposal is effected by high factor dilution.

Preferably, the heated dehydrated crude oil from the dehydrator 31 is passed immediately from the outlet 42, without significant cooling, through an interconnecting conduit 47 into the inlet manifold 48 of an electrical desalter 49. The desalter 49 may be of any suitable design adapted to electrically resolve crude oil and water mixtures. For example, the desalter 49 may be of the same design as dehydrator 31. Process water, which may be characterized as fresh and non-scaling with a pH between 6 and 8, is supplied from any suitable source. The process water is moved by pump 51 through a metering valve 52 to merge with the dehydrated crude oil within the manifold 48. A suitable mixing device in the manifold 48, such as mixing valve 53, provides intimate dispersion of the water into the dehydrated crude oil. The crude oil and water mixture passes through a distributor 54 for uniform distribution throughout the horizontal cross-section of the desalter 49. The desalter 49 contains electrodes 56 and 57 which are energized from a suitable source of high potential such as transformer 58. As a result, an electric field is formed about the electrodes 56 and 57 within the desalter 49. The crude oil and water mixture from the distributor 54 moves upwardly into the electric field about the electrodes. Water is coalesced in the electric field and falls to the lower portions of the desalter 49 to form a body of water 59. The desalted crude oil accumulates about the electrodes and is removed through an outlet 60 containing a back pressure valve 61 for transportation to a refinery in a pipeline 62, or other utilization.

An interface 63 is formed between the body of water 59 and the superimposed desalted crude oil phase. The interface 63 is maintained at a substantially constant level through the use of a motor control valve 64 connected in water outlet 66 and operated by a level controller 67 with a suitable connection illustrated by chain line 68. The aqueous phase is removed from the desalter 49 through the outlet 66 in amounts to maintain the interface 63 at a substantially constant level. The aqueous phase contains amounts of salt and solids extracted from the crude oil, and it may be termed a brine. The brine from the outlet 66 is passed through a conduit 69 which interconnects with the water outlet 35 of the dehydrator 31. Thus, the brine is at substantially elevated temperatures and is preferably mixed with the incoming well fluid in manifold 11. However, the brine in whole or part can be passed directly into the aqueous phase within the separator 12.

The amounts of process water intermixed with the dehydrated crude oil in the manifold 48 are relatively small. The process water is usually less than 15 percent, and generally about 3 to 5 percent by volume of the dehydrated crude oil. The brine is sufficiently high in salt concentration and dispersed crude oil that it cannot be disposed in fresh water streams and lakes. Only relatively small amounts of it are mixed with vastly greater amount of water in the separator 12. As a result, the aqueous phase removed through the water outlet 14 from the gravity separator 12 will be only slightly changed in composition by the small amount of brine admixed with the aqueous phase in the gravity separator 12. Thus, this mixing of the brine into the aqueous phase within the gravity separator 12 provides a most satisfactory method of brine disposal.

In summary, the present invention provides a system for separating the bulk of the water from the wet crude oil phase in the gravity separator 12. The wet crude oil phase is then heated and passed into an electrical dehydrator for removal of the water to produce a pipeline acceptable dehydrated crude oil. The water removed in the electrical dehydrator is at elevated temperatures and is sent to the gravity separator 12 for mixing with the fluids contained therein. Thus, a direct heating exchange effect with the well fluid is obtained. The increased temperature of the crude oil increases the efficiency of phase separation in the separator 12. Thus, the wet crude oil phase which is sent to the heater 26 has a greatly reduced water and solids content. The dehydrated crude oil may be sent directly into a pipeline. Preferably, the hot dehydrated crude oil is mixed with small amounts of fresh water and then passed through an electric desalter to produce a desalted crude oil that may be sent through a pipeline for a direct refining without subsequent treatment. The brine removed from the desalter is at elevated temperatures. The hot brine is intermixed into the fluids within the gravity separation zone for disposal.

From the foregoing, it will be apparent that there has been provided a system well suited for treating a well fluid formed of a mixture of crude oil and large amounts erations in subterranean reservoirs. It is intended that the of water obtained by conducting thermal recovery operations in subterranean reservoirs. It is intended that the foregoing description is illustrative of the present invention. Further, it will be apparent to one skilled in the art that various changes may be made to the disclosed invention without departing from its spirit. It is intended that such changes be encompassed within the scope of the invention which is defined by the appended claims.

1. A process for treating a well fluid formed of a mixture of highly viscous crude oil and large volumes of water by conducting thermal recovery operation in subterranean reservoirs, said process comprising the steps of:
(a) passing the well fluid from a well head directly into a gravity separation zone with a sufficient retention time to effect its separation at ambient field temperatures into an aqueous phase substantially free of crude oil and a wet crude oil phase relatively free of gas;

(b) heating the wet crude oil phase to elevated temperatures sufficient to permit electrical dehydration of the crude oil phase;

(c) subjecting the heated crude oil phase to an electrical fields for producing a dehydrated crude oil phase containing less than about 3% by volume of water and a heated aqueous phase;

(d) mixing the heated aqueous phase separated in the electric field with well fluid in the gravity separation zone for direct heat exchange with the well fluid; and (e) removing from the gravity separation zone sufficient amounts of the aqueous phase derived therefrom for maintaining a substantially constant ratio of water to crude oil volumes within the gravity separation zone and a composition of the removed aqueous phase substantially the same as the water forming the well fluid.

2. The process of claim 1 wherein the crude oil and water are in volumetric ratios greater than 1 to 2 in the well fluid.

3. The process of claim 1 wherein the dehydrated crude oil is mixed with fresh water in an amount up to about 15 volume percent, and the mixture is subjected to an electric field for producing a desalted crude oil phase and an aqueous phase carrying salts and solids which are mixed with the aqueous phase produced in the gravity separation zone.

4. A process for treating a well fluid formed of a mixture of highly viscous crude oil and water in a volume ratio greater than 1 to 2 by conducting thermal recovery operations in subterranean reservoirs, said process comprising the steps of:

(a) passing the crude oil from a well head directly into a gravity separation zone with a sufficient retention time to effect its separation into an aqueous phase substantially free of crude oil and a wet crude oil phase relatively free of gas;

(b) heating the wet crude oil phase to elevated temperatures sufficient to permit electrical dehydration of the crude oil phase;

(c) subjecting the heated crude oil phase to an electrical field for producing a dehydrated crude oil phase and a heated aqueous phase;

(d) mixing the heated aqueous phase separated in the electric field with fluids in the gravity separation zone for direct heat exchange therewith;

(e) mixing fresh water with the dehydrated crude oil phase immediately after removal from the electrical field;

(f) subjecting the water and dehydrated crude oil phase mixture to an electric field for producing a desalted crude oil phase and an aqueous phase which contains salts and solids removed from the crude oil phase;

(g) mixing the aqueous phase carrying salts and solids with the aqueous phase produced in the gravity separation zone; and (h) removing from the gravity separation zone sufficient amounts of the aqueous phase derived therefrom for maintaining a substantially constant amount of water within the gravity separation zone and a composition of the removed aqueous phase substantially the same as the water forming the well fluid including the salts and solids originally carried in the crude oil phase.

5. The process of claim 4 wherein in step (b) the wet crude oil phase is heated to temperatures above about 150° F.; and in step (e), the dehydrated crude oil phase is mixed with fresh water in an amount up to about 15 volume percent.

6. A system for treating a well fluid formed of a mixture of crude oil and large amounts of water by conducting thermal recovery operations in a subterranean reservoir, comprising:

(a) a gravity separator having a well fluid inlet receiving a flow of the well fluid directly from a well head and outlets for separated aqueous and wet crude oil phase relatively free of gas;

(b) a heater connected to said wet crude oil outlet on said gravity separator and an outlet providing heated crude oil;

(c) an electrical dehydrator receiving the heated crude oil by connection to said heater and by action of an electric field producing a dehydrated crude oil phase and a heated aqueous phase;

(d) an electric desalter having an inlet connected through a mixer to said electrical dehydrator whereby fresh water is intermixed with the dehydrated crude oil phase, said desalter having an electric field to resolve the crude oil-water mixture into a desalted crude oil phase and an aqueous phase containing salts and solids removed from the dehydrated crude oil phase;

(e) conduit means for carrying the aqueous phases from said electric desalter and said electric dehydrator into said gravity separator for direct heat exchange therein with the well fluid; and (f) level control means for removing the aqueous phase from said gravity separator in sufficient amounts to maintain a substantially constant volume of the aqueous phase therein and a composition of the removed aqueous phase substantially the same as the water forming the well fluid including the salts and solids originally carried in the crude oil phase.

References Cited
UNITED STATES PATENTS

| | | | |
|---|---|---|---|
| 1,580,591 | 4/1926 | Eddy | 204—302X |
| 2,034,285 | 3/1936 | Eddy | 204—188X |
| 2,412,791 | 12/1946 | Waterman. | |
| 3,441,496 | 4/1969 | Murdock | 204—304 |

JOHN H. MACK, Primary Examiner

N. A. KAPLAN, Assistant Examiner

U.S. Cl. X.R.

204—306, 308

PO-1050
(5/69)

UNITED STATES PATENT OFFICE
CERTIFICATE OF CORRECTION

Patent No. 3,592,752     Dated July 13, 1971

Inventor(s) Reinhold T. Pfeifer

It is certified that error appears in the above-identified patent and that said Letters Patent are hereby corrected as shown below:

Column 6, Line 57, cancel "erations" and substitute therefor

----of water obtained by conducting thermal recovery operations----.

Signed and sealed this 7th day of December 1971.

(SEAL)
Attest:

EDWARD M. FLETCHER, JR.      ROBERT GOTTSCHALK
Attesting Officer            Acting Commissioner of Patents